United States Patent [19]

Paoli et al.

[11] Patent Number: 5,835,253
[45] Date of Patent: Nov. 10, 1998

[54] RASTER OUTPUT SCANNING SYSTEM WITH A SUPER-ELLIPTIC LASER BEAM SOURCE

[75] Inventors: Thomas L. Paoli, Los Altos; Tibor Fisli, Los Altos Hills, both of Calif.

[73] Assignee: Xerox Corporation, Stamford, Conn.

[21] Appl. No.: 540,140

[22] Filed: Oct. 6, 1995

[51] Int. Cl.⁶ .................................................. G02B 26/08
[52] U.S. Cl. ............................................. 359/216; 359/207
[58] Field of Search ........................... 359/212, 216–219, 359/205–207; 372/24; 347/258–261

[56] References Cited

U.S. PATENT DOCUMENTS 5,033,806   7/1991   Tomita et al. ........................ 359/207
5,475,522  12/1995   Itabashi et al. ...................... 359/212
5,557,449   9/1996   Miyagawa et al. ................... 359/212

*Primary Examiner*—James Phan
*Attorney, Agent, or Firm*—William Propp

[57] ABSTRACT

The optical path length of a raster output scanning (ROS) system is minimized by the use of a laser beam source for emitting a light beam with an enlarged divergence ratio. A super-elliptic light source beam with at least an 8:1 elliptic ratio of the major cross-scan axis to the minor scan axis will minimize the optical path length of a raster output scanning (ROS) system. The large divergence ratio of the super-elliptic light beam reduces the required focal lengths in the ROS optics while maintaining the desired numerical apertures and high energy throughput.

1 Claim, 4 Drawing Sheets

RASTER OUTPUT SCANNING SYSTEM WITH A SUPER-ELLIPTIC LASER BEAM SOURCE

BACKGROUND OF THE INVENTION

This invention relates to the light beam source for a raster output scanning (ROS) system and, more particularly, to an elliptic laser beam source with an enlarged cross-scan mode width for raster output scanning systems particularly suitable for use in a compact ROS system design with minimized optical path lengths and focal lengths.

Printing systems utilizing lasers to reproduce information are well known in the art. Typically, such systems include a laser for generating a laser beam, a modulator, such as an acousto-optic modulator or laser diode driver electronics, for modulating the laser beam in accordance with input information to be reproduced, a multifaceted rotating polygon mirror for scanning the modulated laser beam across a medium on a line to line basis, and various optical components to focus and align the laser beam at the medium.

A compact design for the scanning optics of these prior art type of ROS systems is desirable to make the machine itself as compact as possible and to enable extension of the same ROS design into many machine architectures. The scanning system is typically reduced in total area by folding the beam path through the use of a plurality of mirrors.

It would be desirable to improve the efficiency, shorten the optical path lengths, and use as few optical elements as possible to decrease hardware, assembly and alignment costs of these types of ROS systems.

A typical prior art raster output scanning system 10 of FIG. 1 consists of a pre-polygon mirror optical section 12, a rotating polygon mirror scanning element 14 comprising a plurality of reflective facets 16, and a post-polygon mirror optical section 18 to correct for wobble of the rotating polygon mirror and to focus the beam along a scan line.

A light source 20, such as a laser, emits a coherent beam 22 of a single wavelength which is collimated by a collimating lens 24. The collimated beam then passes through a cross-scan cylinder lens 26. The lens 26 is cylindrical in the cross-scan plane and piano in the scan plane. Thus, the lens converges the cross-scan portion of the beam focusing it on a reflective facet 16 of the rotating polygon mirror 14 but allows the scan portion of the beam to remain collimated when the beam strikes the reflective facet.

The collimating lens 24 and the cross-scan cylinder lens 26 are usually the only optical elements in the pre-polygon mirror optical section 12.

The polygon mirror 14 is rotated around its axis of rotation by a conventional motor (not shown), known to those of ordinary skill in the art. The polygon mirror is typically mounted on ball, grease or air bearings (also not shown).

The beam 22 reflected from the facet 16 is still collimated in the scan plane and is now diverging in the cross-scan plane. After reflection from the reflective facet 16, the beam then passes through post-polygon optical section 18, consisting of the f-theta scan lenses 28 and the anamorphic wobble correction lens 30. The f-theta scan lens 28 consists of one to five lens elements (depending upon the required resolution and other performance criteria). In this instance the f-theta scan lens 28 consists of a negative piano-spherical lens 32, a positive piano-spherical lens 34, and the cross-scan cylinder lens 36. This configuration of f-theta scan lenses has sufficient negative distortion to produce a linear scan beam.

The proper selection and design of the optical elements in the f-theta scan lens 28 will produce a flat image plane in both meridians (cross-scan and scan) while maintaining good linearity along the scan line.

After passing through the f-theta scan lens 28, the beam then passes through a wobble correction anamorphic lens element 30 to a scan line 38, typically on a recording medium such as a photoreceptor. The wobble correction optical element can be a lens or a mirror. The purpose of optical element 30 is to correct wobble along the scan line generated by inaccuracies in the polygon mirror/motor assembly. The principal requirement is simply that the optical element be anamorphic.

One well known technique to reduce the size of a ROS system is to introduce folding mirrors to fold the optical path and allow the optical components to be positioned in a more compact area.

The optical path length, and consequently the overall size of a rotating polygon ROS, is largely determined by the focal lengths of the lenses used to focus the beam onto the polygon and thence onto the scan line. The focal lengths are in turn largely set by the diameter of the incident laser beam from the light source. It is desirable to keep the numerical aperture (approximately D/2f) small in order to use the least expensive lenses. Thus, as the diameter of the beam is decreased, the focal lengths in the optical system can be decreased, thereby decreasing the size of the ROS, without the loss of energy throughput. Decreased beam size is therefore a desirable improvement for a laser designed for use in a ROS.

The beam diameter in the cross-scan direction is more important than the beam diameter in the scan direction for reducing the size of the ROS. The large divergence of the laser beam in the scan direction is, in general, apertured to produce the required F number, thereby fixing the spot size on the scan line in the scan direction. On the other hand, in the cross-scan direction, the diameter of the imaged spot is determined by the F/number requirement and the optical magnification of the system which is set by the ratio of the focal lengths for the collimator and cylinder lenses. Accordingly, the size of the ROS is most influenced by the beam diameter in the cross-scan direction.

The cross-scan beam width is determined by the cross-scan divergence of the beam emitted by the laser. The compactness of the ROS can be improved by decreasing the cross-scan divergence of the laser beam or by controlling the divergence ratio of the laser beam.

Two limiting designs must be considered to understand in detail how cross-scan beam size impacts the size and efficiency of a rotating polygon ROS system. For all designs, the divergence of the beam produced by the pre-polygon optics must match the relatively small acceptance angle of the post-polygon optics in order to attain an energy efficient throughput and simultaneously produce the required spot size on the photoreceptor.

A compact design for a ROS system 100 is achieved in the prior art by using short conjugate focal length lenses as in the first limiting case shown in the cross-scan view of FIG. 2. The light source 102 emits a highly diverging light beam 104 which is collimated by a short conjugate collimating lens 106. The distance from the light source 102 to the collimating lens 106 is the object conjugate 108.

The collimated beam 110 from the collimating lens 106 then passes through the short conjugate cylinder lens 112.

The cylinder lens 112 focuses the now converging beam 114 on the polygon facet 116. The distance from the cylinder lens 112 to the polygon facet 116 is the image conjugate 118.

The object conjugate 108 plus the image conjugate 118 plus the collimated portion of the beam 120 between the collimating lens 106 and the cylinder lens 112, or the distance from the light source 102 to the polygon facet 116, is the total optical conjugate from object to image or the optical path length 122.

Because of the short conjugate collimating lens 106 and the short conjugate cylinder lens 112, the optical path length 122 from the light source 102 to the polygon facet 116 in the pre-polygon optics 124 is a minimum.

However, the output divergence angle 126 of the light 114 from the cylinder lens 112 is much larger than the acceptance angle 128 of the post-polygon optics and therefore must be apertured 130. For example, post-polygon optics (not shown) will be between F/40 and F/100 depending on the resolution at the scan line, while the short conjugate lenses 112 will be F/1. Consequently, most of the available light energy 114 is lost as a result of the mismatched optical output and acceptance angles. The compact design of the ROS system 100 is achieved in the prior art by sacrificing energy efficiency.

An energy efficient design for a ROS system 150 is achieved in the prior art by sacrificing compactness in the other limiting case shown in the cross-scan view of FIG. 3. The light source 152 emits a highly diverging light beam 154 which is collimated by a short conjugate collimating lens 156. The distance from the light source 152 to the collimating lens 156 is the object conjugate 158.

The collimated beam 160 from the collimating lens 156 then passes through the long conjugate cylinder lens 162. The cylinder lens 162 focuses the now converging beam 164 on the polygon facet 166. The distance from the cylinder lens 162 to the polygon facet 166 is the image conjugate 168.

The object conjugate 158 plus the image conjugate 168 plus the collimated portion of the beam 170 from the collimating lens 156 to the cylinder lens 162, or the distance from the light source 152 to the polygon facet 166, is the total optical conjugate from object to image or the optical path length 172.

The long conjugate cylinder lens 162 has a focal length 168 long enough to produce an output angle 174 of the focused light beam 164 equal to the acceptance angle 176 of the post-polygon optics (not shown). For example, this condition may require the focal length of the cylinder lens 162 to be 40 to 100 times the focal length of the collimator 156. Thus the energy throughput of the optics is very efficient, but its optical path length 170 from the light source 152 to the polygon facet 166 is excessively large.

Prior art solutions to minimizing optical path lengths in raster output scanning systems usually involve various combinations of lenses and mirrors in the pre-polygon optics. These optical elements can be expensive and difficult to fabricate.

A typical edge emitting laser diode light source has a beam ellipticity ratio ranging from about 4:1 to 5:1 of the length of the major axis (the cross-scan direction) to the minor axis (the scan direction).

Conventional wisdom of those skilled in the ROS art is to decrease the ellipticity of the laser beam, ideally to a circular beam with a ratio of 1:1. This decrease in ellipticity is achieved typically by using beam shaping optics, e.g. two cylinder collimating lenses.

However, none of these prior art techniques involves using the light beam source, rather than the optical components, to minimize the optical path lengths in a raster output scanning (ROS) system.

It is an object of this invention to provide an elliptic laser beam source with an enlarged cross-scan mode width for raster output scanning (ROS) systems to minimize optical path lengths.

SUMMARY OF THE INVENTION

In accordance with the present invention, the optical path length of a raster output scanning (ROS) system is minimized by the use of a laser beam source for emitting a light beam with an enlarged divergence ratio designed to maximize the optical power throughput. A super-elliptic light source beam with at least an 8:1 elliptic ratio of the major cross-scan axis to the minor scan axis will minimize the optical path length of a raster output scanning (ROS) system. The large divergence ratio of the super-elliptic light beam reduces the required focal lengths in the ROS optics while maintaining the desired numerical apertures and high energy throughput.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 4:
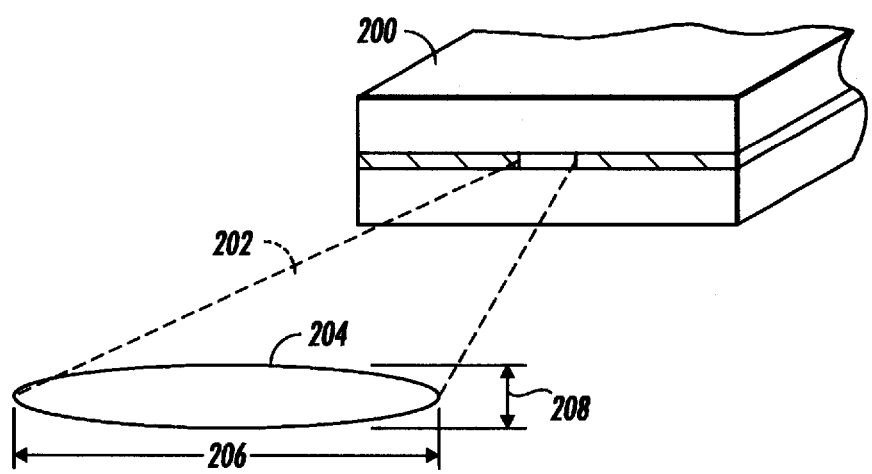
FIG. 4 is a schematic illustration of an elliptic laser beam source with an enlarged cross-scan mode width according to the present invention.

Reference is now made to FIG. 4, wherein there is illustrated an edge emitting semiconductor laser 200 with an enlarged mode width in the cross-scan direction to minimize the optical path length in a raster output scanning (ROS) system. The edge emitting laser 200 emits a coherent light beam 202 of a single wavelength.

The light beam 202 has a beam ellipticity 204 of 8:1 or greater. The ratio of 8:1 is the ratio of the length of the major axis 206 in the cross-scan direction to the minor axis 208 in the scan direction. A typical prior art edge emitting laser has a beam ellipticity ranging from 4:1 to 5:1. In a typical prior art ROS system, the beam ellipticity is increased by aperturing in the pre-polygon optics at the cost of substantially decreased power throughput.

The super-elliptic light source 200 permits the raster output scanning (ROS) system to simultaneously have a minimized optical path length and have energy efficient throughput.

Figure 5:
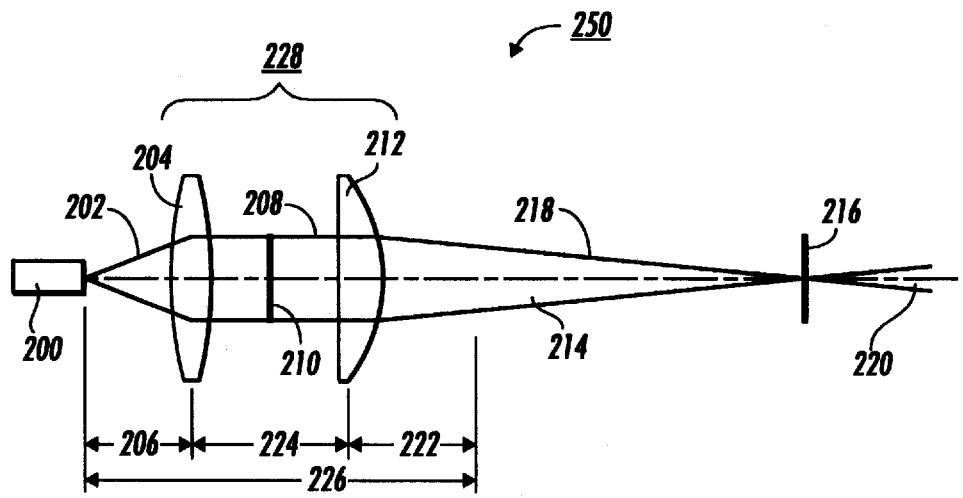
FIG. 5 is a schematic illustration of the cross-section side view of a raster output scanning (ROS) system with the elliptic laser beam source of FIG. 4 according to the present invention.

As shown in the raster output scanning (ROS) system 250 in the cross-scan view of FIG. 5, the laser source 200 emits a light beam 202. The increased ellipticity of the beam provides a decreased beam divergence in the cross scan direction due to less diffraction as contrasted with the highly diverging light beam 104 in prior art FIG. 2. The beam 202 is then collimated by a short conjugate collimating lens 204. The distance from the light source 200 to the collimating lens 204 is the object conjugate 206.

Figure 1:
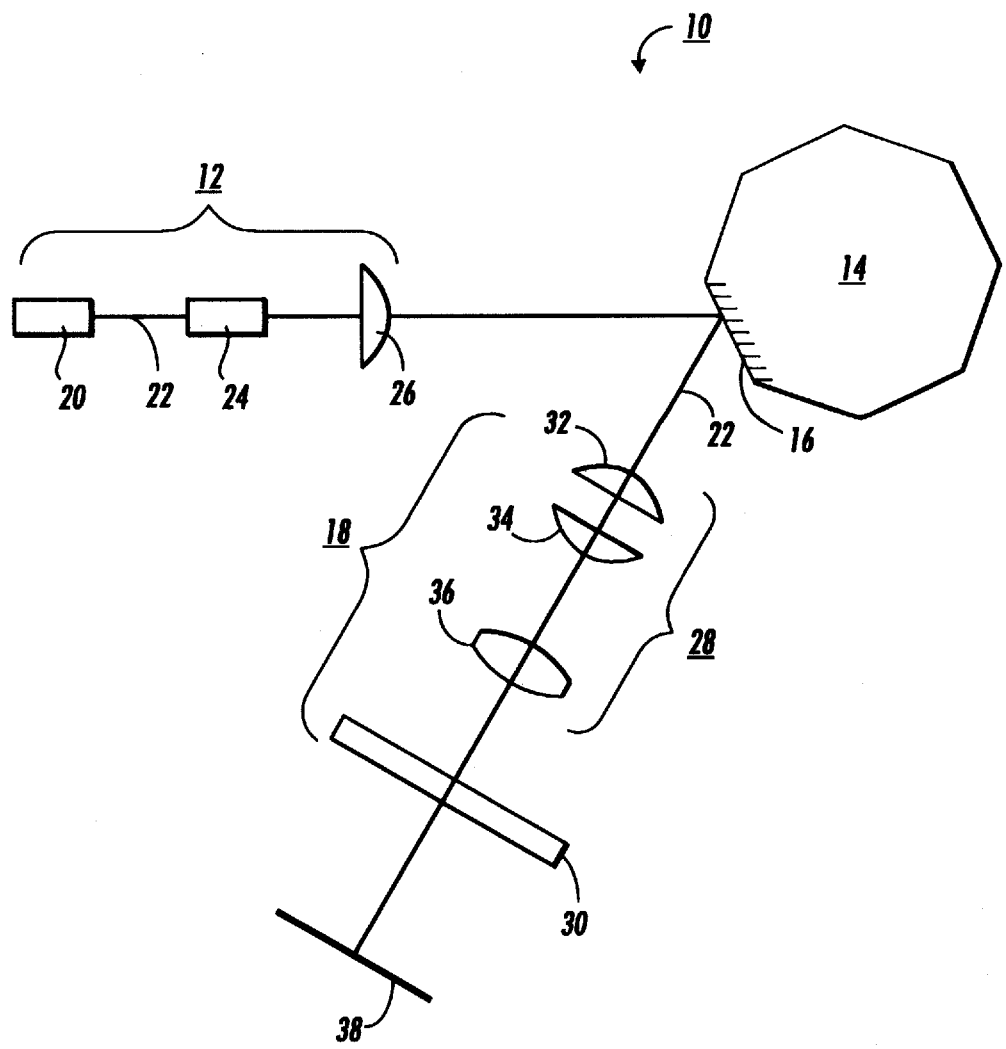
FIG. 1 is a schematic illustration of the cross-section side view of a prior art raster output scanning (ROS) system.
Figure 2:
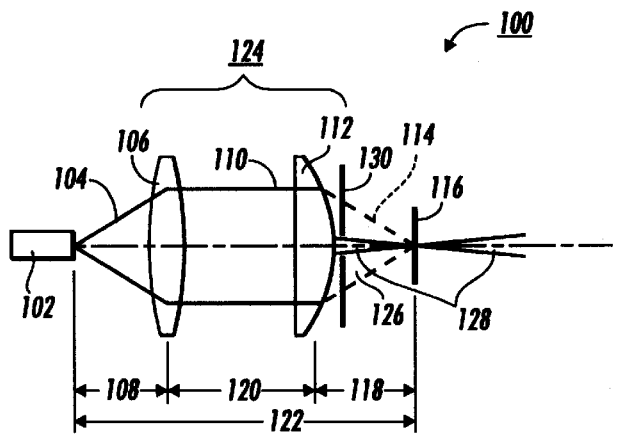
FIG. 2 is a schematic illustration of the cross-scan view of a prior art compact raster output scanning (ROS) system using short conjugate lenses.

The resulting collimated beam 208 from the collimated lens 204 has a decreased width 210 in the cross-scan direction again as contrasted with the collimated beam 110 of prior art FIG. 2. The decreased beam divergence from the initial beam 202 provides a decreased width 210 for the collimated beam 208 in the cross-scan direction.

The collimated beam 208 then passes through a short conjugate cylinder lens 212. The decreased beam width 210 of the collimated beam 208 means that a short conjugate cylinder lens 212 can focus the now converging beam 214 on the polygon facet 216. Simultaneously, the output angle 218 of the beam focused by the short conjugate cylinder lens can match the acceptance angle 220 of the post-polygon optics (not shown).

The distance from the cylinder lens 212 to the polygon facet 216 is the image conjugate 222. The object conjugate 206 plus the image conjugate 222 plus the collimated portion 224 of the beam between the collimating lens 204 and the cylinder lens 212, or the distance from the light source 200 to the polygon facet 216, is the total optical conjugate from object to image or the optical path length 226.

Because of the short conjugate collimating lens 204 and the short conjugate cylinder lens 212, the optical path length 224 from the light source 200 to the polygon facet 216 in the pre-polygon optics 228 is a minimum.

Figure 3:
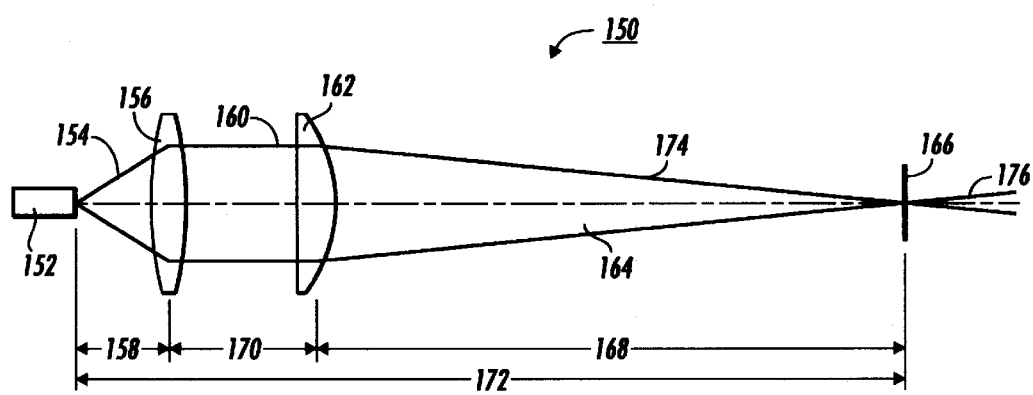
FIG. 3 is a schematic illustration of the cross-scan view of a prior art energy efficient raster output scanning (ROS) system using a long conjugate cylinder lens.

Thus, the optical throughput of the ROS 250 of FIG. 5 is energy efficient without the wasted energy that has to be apertured 126 in the ROS 100 of FIG. 2 and simultaneously the optical path length 226 can be short, unlike the optical path length 170 of the ROS 150 in FIG. 3.

The less diverging the beam is from the light source, the lower the magnification necessary for the eventual output angle of the optical beam at the facet to match the acceptance angle.

By way of example, the most desirable optical elements in the pre-polygon optics of a ROS system will have the shortest focal length collimator that provides sufficient cross-scan beam width with the lowest magnification from the light source to the polygon facet, thereby having the shortest focal length cylinder lens.

By way of illustration, a 300 spi (spots per inch) ROS system could have an F/100 while a 600 spi ROS system could have an F/50.

A one to one magnification is optically very difficult. For the output angle 218 of FIG. 5 to match the acceptance angle 220, a low practical magnification would be 3×. A short focal length for the collimator 204 would be 10 mm. Therefore, the shortest focal length for the cylinder lens 212 would be 30 mm.

Thus, the object conjugate 206 from the light source 200 to the collimator lens 204 would be 10 mm. The separation 224 between the collimator lens 204 and the cylinder lens 212 would be 10 mm or less. The image conjugate 222 from the cylinder lens 212 to the polygon facet 216 would be 30 mm. The total optical path length 224 for this F/50 ROS system would be 50 mm or less.

Since the acceptance angle 220 matches the output angle 218, the post-polygon optics could have highly efficient throughput at the desired F/number.

A single toroidal lens could be substituted for the two lenses of the pre-polygon optics, i.e. the short conjugate collimating lens and the short conjugate cylinder lens.

The enlarged cross-scan mode width of the light beam means an increase in the beam ellipticity. This approach is contrary to the prior art and the prevailing belief of those skilled in the art that circular beams are most desirable for a rotating polygon ROS system using motion correction optics in the post-polygon optics. The super-elliptic beam does not require changes in the post-polygon optics of the ROS. A super-elliptic beam enables compact formation of the pre-polygon beam for an efficient match to the post-polygon beam.

Figure 6:
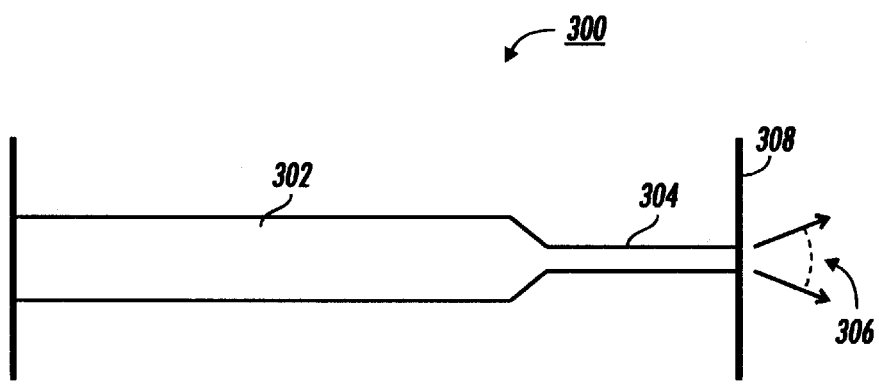
FIG. 6 is a schematic illustration of of the cross-section side view of one embodiment of the elliptic laser beam source of FIG. 4 according to the present invention.

One means of increasing the ellipticity of a light beam in the cross-scan direction is the semiconductor diode laser 300 of FIG. 6. The active laser waveguide 302 is coupled through a narrow transparent optical waveguide 304. The active region 302 emits the light beam which is transmitted through the coaxial and coplanar passive waveguide 304 before the light beam 306 is emitted through an edge reflective mirror 308 of the semiconductor diode laser 300. Structures of this kind can be made with etch and regrowth techniques or by impurity induced layer disordering as disclosed by Thornton et al. in U.S. Pat. No. 4,802,182 or by Paoli in U.S. Pat. No. 5,287,376, both commonly assigned as the present application and both herein incorporated by reference. The active waveguide and the passive waveguide can be formed integrally within the monolithic semiconductor laser structure.

The passive waveguide 304 is narrower with an increased bandgap than the active waveguide 302. The active waveguide of the laser emitter and the passive optical waveguides have a higher index of refraction than the neighboring areas of the active layer and a higher index of refraction than the adjacent cladding layers of the semiconductor structure. Thus, the light generated in the active waveguide and transmitted by the low-loss passive optical waveguide is confined by the well-known phenomena of total internal reflection within the active layer of the monolithic semiconductor structure.

The passive optical waveguide is integrally formed in the active layer and has an energy bandgap greater than the energy of the generated lightwaves so that the waveguide structure is nearly transparent to the lightwaves generated by the active waveguides and does not need to be forward-biased to transmit the lightwaves. The diffraction and scattering losses within the two-dimensional passive optical waveguide are low. The propagation loss along the two-dimensional passive optical waveguide is also low due to its increased bandgap.

Because the narrow output passive waveguide 304 is too narrow to completely confine the waveguided mode of the light beam, the beam spreads in the cross-scan direction to form an enlarged spot with less divergence. The cross-scan size of the beam can be increased by a factor of more than 3 this way.

An enlarged cross-scan beam can also be obtained by flaring the passive laser waveguide at the laser's output facet. However, flaring may produce a distorted mode profile due to excitation of non-fundamental modes if the flare is not adiabatic. Therefore, the narrow waveguided output coupler of the semiconductor laser 300 is preferred.

The cross-scan and scan divergences of the beam are independently selectable. The ellipticity of the beam can, therefore, be adjusted to accommodate any F/number for the optics of the ROS system. Unlike the prior art ROS systems, the beam need not be apertured nor have a long focal length to fit the F/number of the post-polygon optics. An enlarged divergence ratio to the light beam source for a ROS system provides increased optical power throughput to the ROS system.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A raster optical scanning system with a reduced optical path length comprising:

a rotating polygon having a plurality of reflective facets, a light source for emitting at least one light beam, first optical means for collimating and focusing said light beam from said light source onto one of said reflective facets, and second optical means for focusing said light beam reflected from said one of said reflective facets to a scan line, wherein said light beam emitted from said light source has an elliptic ratio of at least 8:1 in the cross-scan to scan axes such that said optical path length between said light source and said rotating polygon is minimized.

\* \* \* \* \*